United States Patent
Ikeda

(10) Patent No.: US 11,228,263 B2
(45) Date of Patent: Jan. 18, 2022

(54) MOTOR CONTROL APPARATUS AND MOTOR CONTROL APPARATUS CONTROL METHOD

(71) Applicant: Mitsuba Corporation, Gunma (JP)

(72) Inventor: Takeshi Ikeda, Kiryu (JP)

(73) Assignee: Mitsuba Corporation, Gunma (JP)

( * ) Notice: Subject to any disclaimer, the term of this patent is extended or adjusted under 35 U.S.C. 154(b) by 372 days.

(21) Appl. No.: 16/479,655

(22) PCT Filed: Feb. 2, 2018

(86) PCT No.: PCT/JP2018/003596
§ 371 (c)(1),
(2) Date: Jul. 22, 2019

(87) PCT Pub. No.: WO2018/150908
PCT Pub. Date: Aug. 23, 2018

(65) Prior Publication Data
US 2021/0336568 A1    Oct. 28, 2021

(30) Foreign Application Priority Data
Feb. 15, 2017  (JP) .............................. JP2017-025961

(51) Int. Cl.
*H02P 6/18* (2016.01)
*H02P 6/16* (2016.01)

(52) U.S. Cl.
CPC ...................... *H02P 6/16* (2013.01)

(58) Field of Classification Search
CPC .................................. H02P 6/188; H02P 6/16
See application file for complete search history.

(56) References Cited

U.S. PATENT DOCUMENTS

| | | | | |
|---|---|---|---|---|
| 2010/0045219 A1* | 2/2010 | Ajima | ...................... | H02P 6/16 318/400.04 |
| 2013/0113400 A1* | 5/2013 | Kishimoto | .............. | H02P 6/188 318/400.14 |

FOREIGN PATENT DOCUMENTS

| | | |
|---|---|---|
| JP | 11225495 A | 8/1999 |
| JP | 2003164180 A | 6/2003 |

(Continued)

OTHER PUBLICATIONS

PCT Office, International Search Report issued in corresponding PCT/JP2018/003596 dated Apr. 24, 2018, 2 pages.

(Continued)

*Primary Examiner* — Cortez M Cook
(74) *Attorney, Agent, or Firm* — Wood Herron & Evans LLP

(57) ABSTRACT

A motor control apparatus that is configured to perform a power distribution control on three-phase coils of a brushless motor and that is configured to perform a rotation control of a rotor includes: a plurality of switching elements that are arranged to be capable of switching a current which is allowed to flow through the coils; a plurality of sensors that are configured to detect a rotation position of the rotor; and a control part that is configured to output a drive signal for controlling a power distribution pattern of each switching element according to a position detection signal which is obtained by correcting a position detection signal as an output of the plurality of sensors by using a predetermined correction coefficient, wherein the control part is configured to add a correction angle that corresponds to a difference between the position detection signals before and after correction of a predetermined sensor among the plurality of sensors to a setting value of an advance angle of the power distribution control and select an output pattern that includes a plurality of power distribution patterns and that is used (Continued)

when selecting the power distribution pattern, from a plurality of different output patterns in accordance with the advance angle to which the correction angle is added and a power distribution angle of the power distribution control.

3 Claims, 9 Drawing Sheets

(56) References Cited

FOREIGN PATENT DOCUMENTS

| JP | 2003311077 A | 11/2003 |
|----|--------------|---------|
| JP | 2005110363 A | 4/2005 |
| JP | 2010119220 A | 5/2010 |
| JP | 4724024 B2 | 7/2011 |
| JP | 2011217584 A | 10/2011 |
| JP | 2016111912 A | 6/2016 |

OTHER PUBLICATIONS

European Patent Office, Search Report issued in EP 18754104.0 dated Nov. 20, 2020.

* cited by examiner

FIG. 7

|  |  |  | STAGE | | | | | | | | | | | | | | | | |
|---|---|---|---|---|---|---|---|---|---|---|---|---|---|---|---|---|---|---|---|
|  |  |  | 1 | | | 2 | | | 3 | | | 4 | | | 5 | | | 6 | | |
|  |  |  | A | B | C | A | B | C | A | B | C | A | B | C | A | B | C | A | B | C |
| SWITCHING ELEMENT | U | H | 0 | P | P | P | P | P | P | P | 0 | 0 | 1 | 1 | 1 | 1 | 1 | 1 | 1 | 0 |
|  |  | L | 0 | P | P | P | P | P | P | P | 0 | 0 | 0 | 0 | 0 | 0 | 0 | 0 | 0 | 0 |
|  | V | H | P | P | 0 | 0 | 1 | 1 | 1 | 1 | 1 | 1 | 1 | 0 | 0 | P | P | P | P | P |
|  |  | L | P | P | 0 | 0 | 0 | 0 | 0 | 0 | 0 | 0 | 0 | 0 | 0 | P | P | P | P | P |
|  | W | H | 1 | 1 | 1 | 1 | 1 | 0 | 0 | P | P | P | P | P | P | P | 0 | 0 | 1 | 1 |
|  |  | L | 0 | 0 | 0 | 0 | 0 | 0 | 0 | P | P | P | P | P | P | P | 0 | 0 | 0 | 0 |

954

MOTOR CONTROL APPARATUS AND MOTOR CONTROL APPARATUS CONTROL METHOD

TECHNICAL FIELD

The present invention relates to a motor control apparatus and a motor control apparatus control method.

Priority is claimed on Japanese Patent Application No. 2017-025961 filed on Feb. 15, 2017, the contents of which are incorporated herein by reference.

BACKGROUND

A brushless motor includes a stator having three-phase coils U, V, W and a rotor having a field permanent magnet. The brushless motor is driven by performing a power distribution control of the stator in accordance with a rotation position of the rotor. The rotation position of the rotor is acquired, for example, by detecting a position of magnetic poles that are included in the rotor or a position of magnetic poles of a sensor magnet that rotates together with the rotor by using a plurality of Hall sensors or the like. In the detection of the rotation position of the rotor, a detection error occurs due to the dispersion of the arrangement of the Hall sensor, the dispersion of the magnetic pole which the Hall sensor faces, and the like (for example, Patent Documents 1 to 3). Patent Documents 1 to 3 show a configuration for correcting the detection error of the rotation position of the rotor.

In a configuration described in Patent Document 1, a position displacement from a regular position of each Hall sensor that is measured in advance is stored, the detection error of the rotation position is corrected on the basis of the stored information. In this case, the measurement of the position displacement is performed by confirming an output of the Hall sensor each time the angle of the rotor is rotated, for example, by 0.1°. In a configuration described in Patent Document 2, a cycle in which a sensor magnet rotates one revolution is measured, and by dividing the measured cycle for the one revolution by the number of magnetic poles, an ideal cycle between magnetic poles is calculated. Then, by using the calculated ideal cycle, the detection error of each sensor is calculated. In a configuration described in Patent Document 3, a rotor is rotated at a predetermined rotation number, and by comparing a theoretical value in a case where there is no error and an actual measurement result, the detection error is calculated.

RELATED ART DOCUMENTS

Patent Documents

[Patent Document 1] Japanese Unexamined Patent Application, First Publication No. 2005-110363

[Patent Document 2] Japanese Patent No. 4724024

[Patent Document 3] Japanese Unexamined Patent Application, First Publication No. 2010-119220

SUMMARY OF INVENTION

Problems to be Solved by the Invention

In the configuration described in Patent Document 1, the position displacement is measured by confirming the output of each Hall sensor while measuring the rotation position of the rotor by using a different measurement device than the Hall sensor. In this configuration, it is possible to acquire the position displacement of the Hall sensor and the displacement of the magnetic pole position with reference to a predetermined position of the rotor. In this case, it is possible to correct the detection position for each Hall sensor with reference to the predetermined position. However, there is a problem that costs are required for the measurement of the position displacement.

On the other hand, in the configurations described in Patent Document 2 and Patent Document 3, it is possible to correct the dispersion of the spacing between the Hall sensors and between the magnetic poles. However, it is impossible to understand which one of detection positions of a plurality of Hall sensors is the closest to a theoretical value.

An object of an aspect of the present invention is to provide a motor control apparatus and a motor control apparatus control method capable of correcting a detection error of a rotation position of a rotor at low cost and with high accuracy.

Means for Solving the Problem

An aspect of the present invention is a motor control apparatus that is configured to perform a power distribution control on three-phase coils of a brushless motor and that is configured to perform a rotation control of a rotor, the motor control apparatus including: a plurality of switching elements that are arranged to be capable of switching a current which is allowed to flow through the coils; a plurality of sensors that are configured to detect a rotation position of the rotor; and a control part that is configured to output a drive signal for controlling a power distribution pattern of each switching element according to a position detection signal which is obtained by correcting a position detection signal as an output of the plurality of sensors by using a predetermined correction coefficient, wherein the control part is configured to add a correction angle that corresponds to a difference between the position detection signals before and after correction of a predetermined sensor among the plurality of sensors to a setting value of an advance angle of the power distribution control and select an output pattern that includes a plurality of the power distribution patterns and that is used when selecting the power distribution pattern, from a plurality of the different output patterns in accordance with the advance angle to which the correction angle is added and a power distribution angle of the power distribution control.

In the above motor control apparatus, the power distribution pattern may be controlled in synchronization with a timing of rising or falling of the position detection signal, and the plurality of output patterns may include a first output pattern that does not include a power distribution pattern which makes the switching element be continuously in the same power distribution state throughout three or more timings and a second output pattern that includes the power distribution pattern which makes the switching element be continuously in the same power distribution state throughout three or more timings.

A motor control apparatus control method according to another aspect of the present invention is a control method of a motor control apparatus that is configured to perform a power distribution control on three-phase coils of a brushless motor and that is configured to perform a rotation control of a rotor, the motor control apparatus including: a plurality of switching elements that are arranged to be capable of switching a current which is allowed to flow through the coils; a plurality of sensors that are configured to detect a rotation position of the rotor; and a control part that is configured to output a drive signal for controlling a power distribution pattern of each switching element according to a position detection signal which is obtained by correcting a position detection signal as an output of the plurality of sensors by using a predetermined correction coefficient, wherein the control method includes: by way of the control part, adding a correction angle that corresponds to a difference between the position detection signals before and after correction of a predetermined sensor among the plurality of sensors to a setting value of an advance angle of the power distribution control; and selecting an output pattern that includes a plurality of the power distribution patterns and that is used when selecting the power distribution pattern, from a plurality of the different output patterns in accordance with the advance angle to which the correction angle is added and a power distribution angle of the power distribution control.

Advantage of the Invention

According to an aspect of the present invention, it is possible to correct a detection error of a rotation position of a rotor at low cost and with high accuracy.

BRIEF DESCRIPTION OF THE DRAWINGS

FIG. 7 is a view showing the first output pattern that is used by the motor control apparatus shown in FIG. 1.

DESCRIPTION OF THE EMBODIMENTS

Figure 1:
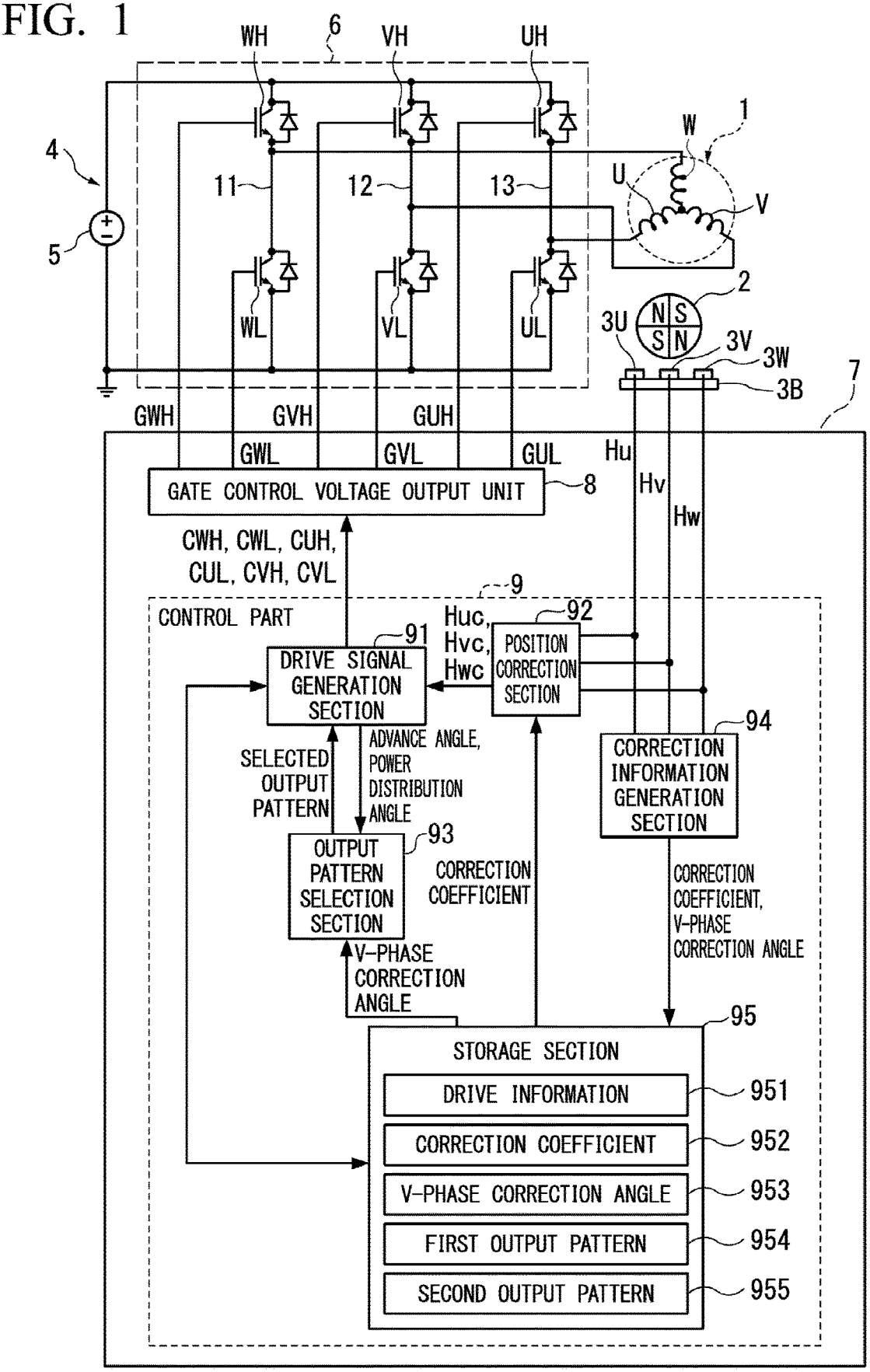
FIG. 1 is a block diagram showing a control system of a motor control apparatus according to an embodiment of the present invention.

Hereinafter, the present invention is described according to an embodiment, but the present invention is not limited to the following embodiment. Further, all of the combinations of features described in the embodiment are not necessarily indispensable for solving the problem addressed by the invention. In the drawings, the same reference numerals may be given to the same or similar parts, and redundant descriptions may be omitted. The shape, size, and the like of an element in the drawing may be exaggerated for clear description.

Hereinafter, a motor control apparatus in the present embodiment is described with reference to the drawings.

FIG. 1 is a block diagram showing a control system of a motor control apparatus 4 of the present embodiment. FIG. 1 shows a configuration of a brushless motor 1 and a motor control apparatus 4. The brushless motor 1 includes a stator having three-phase coils U, V, W and a rotor having a field permanent magnet. A sensor magnet 2 that is rotated together with the rotor is attached to a rotation shaft of the rotor.

Figure 2:
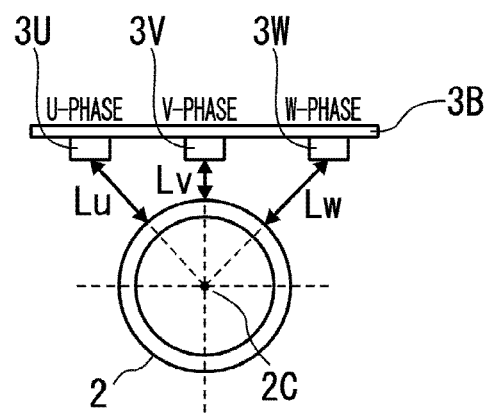
FIG. 2 is a view showing an example of a structure of three Hall sensors shown in FIG. 1 with respect to a sensor magnet.

The sensor magnet 2 is magnetized by S and N poles alternately in a rotation direction. Three Hall sensors 3U, 3V, 3W (sensor) that detect a rotation position are attached to the vicinity of the sensor magnet 2 at an interval of 120° in the rotation direction such that it is possible to detect the switching of magnetic poles of the sensor magnet 2. The three Hall sensors 3U, 3V, 3W are attached to a planar substrate 3B that is separated from the sensor magnet 2 as shown in FIG. 2. A distance Lv of the Hall sensor 3V (a predetermined sensor) from a center line 2C in the rotation of the sensor magnet 2 is the shortest distance among distances Lu, Lv, Lw of the three Hall sensors 3U, 3V, 3W to the center line 2C. In such a structure, it is adequate to perform positioning with respect to the sensor magnet 2 with reference to the Hall sensor 3V that is positioned in the middle of the three Hall sensors 3U, 3V, 3W and that is positioned at the shortest distance with respect to the sensor magnet 2. For example, in a case where the Hall sensor 3U is used as a reference, the detection error of the Hall sensor 3W tends to be larger compared to a case where the Hall sensor 3V is used as a reference. In the present embodiment, the Hall sensor 3V is the predetermined sensor that becomes the reference when calculating a V-phase correction angle described later; however, in a case where a second Hall sensor is attached to the planar substrate 3B at the shortest distance, the second Hall sensor that is attached to the planar substrate 3B at the shortest distance may be the predetermined sensor.

The motor control apparatus 4 includes an inverter circuit 6 that switches a current which is allowed to flow from a DC electric power source 5 to the coils U, V, W, the three Hall sensors 3U, 3V, 3W, and a control circuit 7 to which an output of each of the Hall sensors 3U, 3V, 3W is input and which performs switching of the inverter circuit 6.

In the inverter circuit 6, three arms (a first arm 11, a second arm 12, and a third arm 13) are connected to the DC electric power source 5 in parallel. In the first arm 11, a connection point between two switching elements WH, WL is connected to the coil W. In the second arm 12, a connection point between two switching elements VH, VL is connected to the coil V. In the third arm 13, a connection point between two switching elements UH, UL is connected to the coil U. In the example shown in FIG. 1, the switching elements WH, WL, VH, VL, UH, UL are formed of an IGBT (insulated gate bipolar transistor) and a freewheel diode having a cathode that is connected to a collector of the IGBT and an anode that is connected to an emitter of the IGBT but may be formed of, for example, a MOSFET (metal-oxide semiconductor field-effect transistor) and the like. The coils U, V, W are connected, for example, by a star connection. Each of end parts of the coils U, V, W on the opposite side of a connecting point (neutral point) side is electrically connected to the inverter circuit 6.

The Hall sensors 3U, 3V, 3W included in the motor control apparatus 4 are formed of, for example, a Hall IC (integrated circuit). When the rotation shaft of the rotor is rotated, the Hall sensors 3U, 3V, 3W detects the rotation position of the rotation shaft, the Hall sensor 3U outputs a position detection signal Hu as an output signal corresponding to the U-phase to the control circuit 7, the Hall sensor 3V outputs a position detection signal Hv as an output signal corresponding to the V-phase to the control circuit 7, and the Hall sensor 3W outputs a position detection signal Hw as an output signal corresponding to the W-phase to the control circuit 7.

The control circuit 7 includes a gate control voltage output part 8 and a control part 9.

The gate control voltage output part 8 generates and outputs PWM signals GWH, GWL, GVH, GVL, GUH, GUL each of which is applied to each of gates of the switching elements WH, WL, VH, VL, UH, UL on the basis of PWM signals (drive signals) CWH, CWL, CVH, CVL, CUH, CUL that are input from a drive signal generation section 91.

The control part 9 is a microcomputer (processor) that includes a CPU (central processing unit), a RAM (random access memory), a ROM (read-only memory), and the like. The ROM includes a rewritable non-volatile storage device such as a flash memory. The control part 9 includes the drive signal generation section 91, a position correction section 92, an output pattern selection section 93, a correction information generation section 94, and a storage section 95. The storage section 95 stores drive information 951, a correction coefficient 952, a V-phase correction angle 953, a first output pattern 954, and a second output pattern 955.

The motor control apparatus 4 of the present embodiment includes at least following two functions. That is, the motor control apparatus 4 includes a function of generating and storing correction information for correcting a detection error included in the position detection signals Hu, Hv, Hw of the Hall sensors 3U, 3V, 3W and a function (hereinafter, referred to as a drive control function) of driving and controlling the brushless motor 1 on the basis of the stored correction information and the position detection signals Hu, Hv, Hw of the Hall sensors 3U, 3V, 3W.

The drive information 951 that is stored in the storage section 95 is information representing how the control circuit 7 drives the inverter circuit 6 in the drive control function. The drive information 951 includes, for example, information representing a correspondence relationship between an operation command (representing a command content such as starting, stopping, normal rotation, reverse rotation, outputting, and a rotation number) relating to the driving of the brushless motor 1 and command values of an advance angle and a power distribution angle in a power distribution control of the inverter circuit 6. The drive signal generation section 91 determines an advance angle value and a power distribution angle value, for example, by referring to the drive information 951 and the like.

Figure 3:
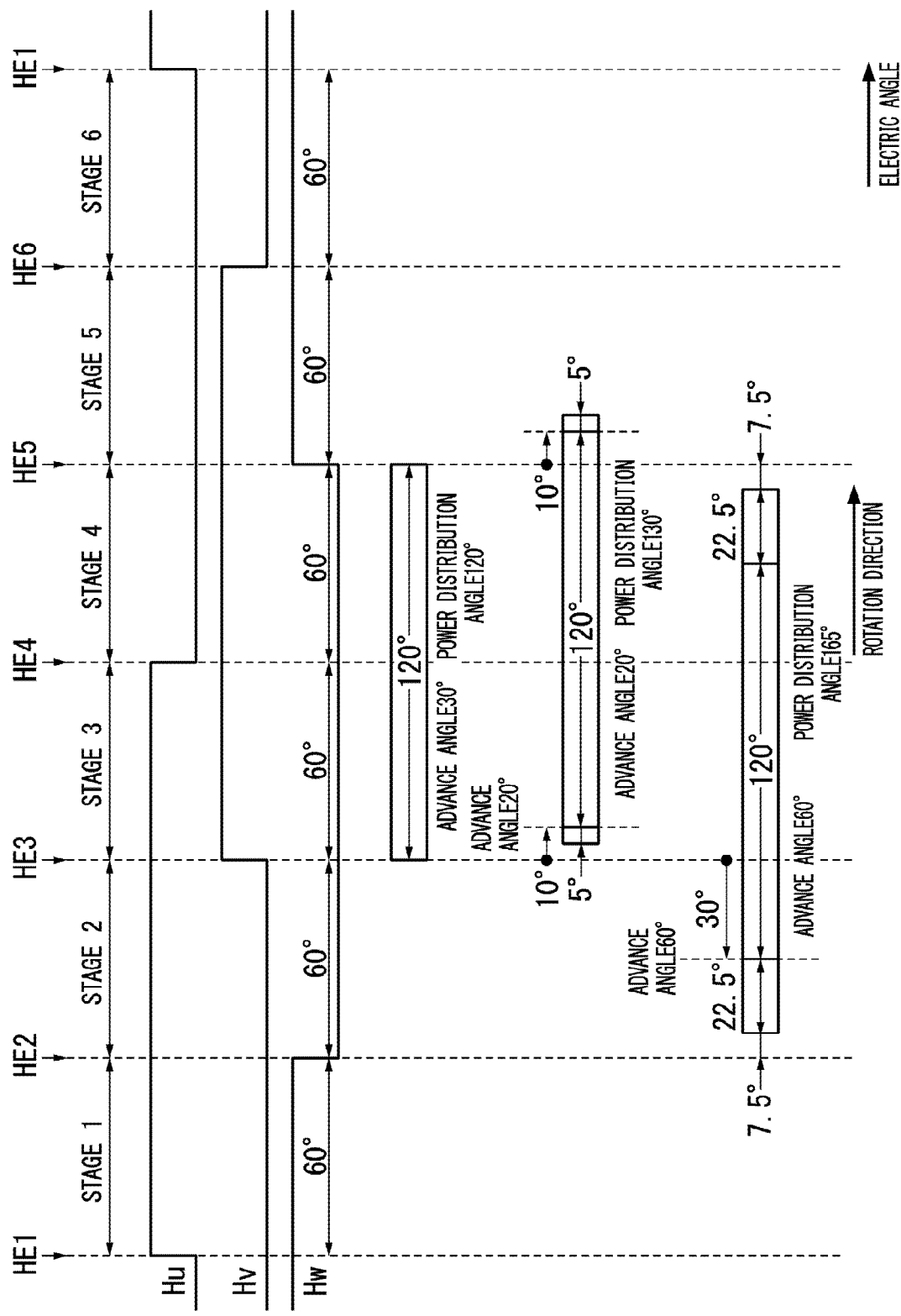
FIG. 3 is a view showing an operation example of the motor control apparatus shown in FIG. 1.

FIG. 3 is a view showing an example of the position detection signals Hu, Hv, Hw that are output by the Hall sensors 3U, 3V, 3W and the advance angle and the power distribution angle in the power distribution control of the inverter circuit 6. FIG. 3 shows a correspondence relationship between the position detection signals Hu, Hv, Hw and an angle range in which the switching element VH is turned on. The horizontal axis represents the rotation position of the magnetic pole of the rotor of the brushless motor 1 using an electric angle. The position detection signals Hu, Hv, Hw has a phase difference of 120° from one another and changes to a H level or a L level at each 180° in a situation where an electric angle of 360° is one cycle. In the present embodiment, a change from the L level to the H level of the position detection signal Hu is referred to as a Hall edge HE1. A change from the H level to the L level of the position detection signal Hu is referred to as a Hall edge HE4. A change from the L level to the H level of the position detection signal Hv is referred to as a Hall edge HE3. A change from the H level to the L level of the position detection signal Hv is referred to as a Hall edge HE6. A change from the L level to the H level of the position detection signal Hw is referred to as a Hall edge HE5. A change from the H level to the L level of the position detection signal Hw is referred to as a Hall edge HE2. When the position detection signals Hu, Hv, Hw that are output by the Hall sensors 3U, 3V, 3W do not include an error (the example shown in FIG. 3 is a case in which the position detection signals Hu, Hv, Hw do not include an error), electric angles between the Hall edges are 60°. A region between the Hall edge HE1 and the Hall edge HE2 is referred to as a Hall stage 1 (hereinafter, simply referred to as a stage 1 (the same applies hereinafter)). A region between the Hall edge HE2 and the Hall edge HE3 is referred to as a stage 2. A region between the Hall edge HE3 and the Hall edge HE4 is referred to as a stage 3. A region between the Hall edge HE4 and the Hall edge HE5 is referred to as a stage 4. A region between the Hall edge HE5 and the Hall edge HE6 is referred to as a stage 5. A region between the Hall edge HE6 and the Hall edge HE1 is referred to as a stage 6.

In a case where the advance angle is 30°, and the power distribution angle is 120° in the power distribution control of the inverter circuit 6, the drive signal generation section 91 turns on the switching element VH in synchronization with the Hall edge HE3 and turns off the switching element VH in synchronization with the Hall edge HE5. In the present embodiment, the Hall sensors 3U, 3V, 3W are arranged such that the position detection signals Hu, Hv, Hw generate the Hall edges HE1 to HE6 at a position that is advanced by an electric angle of 30° with respect to the magnetic pole position of the rotor.

Accordingly, by turning on the switching element VH in synchronization with the Hall edge HE3, a value of the advance angle becomes 30°. In the present embodiment, the drive signal generation section 91 changes values of the advance angle and the power distribution angle with reference to the power distribution control of the advance angle of 30° and the power distribution angle of 120°.

For example, in a case where the advance angle is 20°, and the power distribution angle is 130° in the power distribution control of the inverter circuit 6, the drive signal generation section 91 turns on the switching element VH at a rotation position (a rotation position that is delayed by an angle of 5° from the Hall edge HE3) that is delayed by an angle of 10° and is advanced by an angle of 5° from the Hall edge HE3. The delay angle of 10° corresponds to a change amount (20°−30°=−10°) from the advance angle of 30° which becomes the reference when the advance angle is 20°. The advance angle of 5° corresponds to a half ((130°−120°)×0.5=5°) of a change amount of the power distribution angle of 130° from the power distribution angle of 120° which becomes the reference. The drive signal generation section 91 turns off the switching element VH at a rotation position that is delayed by an angle of 15° from the Hall edge HE5.

For example, in a case where the advance angle is 60°, and the power distribution angle is 165° in the power distribution control of the inverter circuit 6, the drive signal generation section 91 turns on the switching element VH at a rotation position (a rotation position that is advanced by an angle of 52.5° from the Hall edge HE3) that is advanced by an angle of 30° and is further advanced by an angle of 22.5° from the Hall edge HE3. The advance angle of 30° corresponds to a change amount (60°−30°=30°) from the advance angle of 30° which becomes the reference when the advance angle is 60°. The advance angle of 22.5° corresponds to a half ((165°−120°)×0.5=22.5°) of a change amount of the power distribution angle of 165° from the power distribution angle of 120° which becomes the reference. The drive signal generation section 91 turns off the switching element VH at a rotation position that is advanced by an angle of 7.5° from the Hall edge HE5.

On the other hand, the correction coefficient 952 and the V-phase correction angle 953 that are stored in the storage section 95 are information for correcting a detection error which is included in the position detection signals Hu, Hv, Hw that are output by the Hall sensors 3U, 3V, 3W and are generated by the correction information generation section 94. The correction information generation section 94 generates the correction coefficient 952 and the V-phase correction angle 953 on the basis of the position detection signals Hu, Hv, Hw that are output by the Hall sensors 3U, 3V, 3W.

Figure 4:
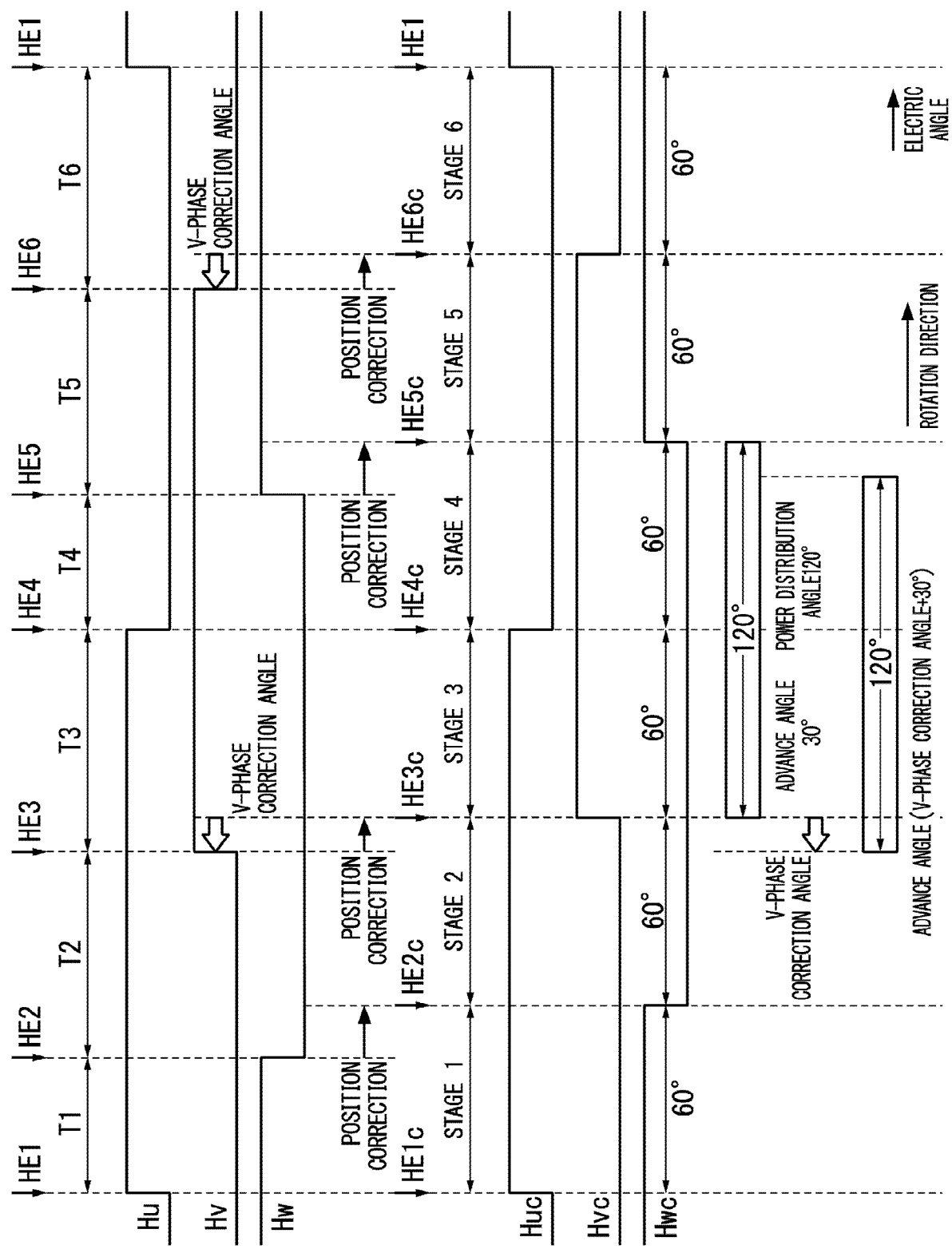
FIG. 4 is a view showing an operation example of the motor control apparatus shown in FIG. 1.

First, the correction coefficient 952 is described. The correction coefficient 952 is a coefficient for correcting a dispersion in a case where there is a dispersion of the intervals of the Hall edges HE1 to HE6 in the position detection signals Hu, Hv, Hw, for example, as shown in FIG. 4. FIG. 4 is a view using an electric angle for the horizontal axis and showing the position detection signals Hu, Hv, Hw, position detection signals Huc, Hvc, Hwc that are obtained by correcting the position detection signals Hu, Hv, Hw by the position correction section 92, and an example of a power distribution control similarly to FIG. 3.

The correction information generation section 94 measures time intervals T1 to T6 of the Hall edges HE1 to HE6 in the position detection signals Hu, Hv, Hw in a state where the brushless motor 1 is rotated at a constant speed. Then, the correction information generation section 94 determines, among two Hall edges having a minimum time interval, a Hall edge of which the time interval is decreased by enlarging the position of the Hall edge in a rotation direction of the brushless motor 1 as a reference Hall edge and determines any one of the position detection signals Hu, Hv, Hw which corresponds to a phase at which the reference Hall edge is present as a reference position detection signal. In the example shown in FIG. 4, a time interval T4 is minimum, and among the Hall edge HE4 and the Hall edge HE5, the Hall edge of which the time interval is decreased by moving the position of the Hall edge in the rotation direction is the Hall edge HE4. Accordingly, the Hall edge HE4 becomes the reference Hall edge, and the position detection signal Hu becomes the reference position detection signal.

Then, the correction information generation section 94 calculates an average value of the time intervals that correspond to the H level or the L level of the determined reference position detection signal. In the example shown in FIG. 4, the correction information generation section 94 calculates an average value of the time intervals T1, T2, T3 that correspond to the H level of the position detection signal Hu that is determined as the reference position detection signal and calculates an average value of the time intervals T4, T5, T6 that correspond to the L level. Further, the correction information generation section 94 calculates a value of a ratio of each time interval and the calculated average value as a correction coefficient for each of the Hall edges HE1 to HE6. The correction information generation section 94 stores the calculated correction coefficient of each of the Hall edges HE1 to HE6 together with information that specifies the reference position detection signal as the correction coefficient 952 in the storage section 95.

On the other hand, the position correction section 92 corrects the intervals of the Hall edges HE1 to HE6 in the position detection signals Hu, Hv, Hw by using the correction coefficient 952 that is generated by the correction information generation section 94, generates corrected position detection signals Huc, Hvc, Hwc, and outputs the corrected position detection signals Huc, Hvc, Hwc to the drive signal generation section 91. In the example shown in FIG. 4, the position correction section 92 corrects each position of the Hall edges HE1 to HE6 in the position detection signals Hu, Hv, Hw by using the correction coefficient 952 and generates the position detection signals Huc, Hvc, Hwc having Hall edges HE1c to HE6c that are equally spaced.

Next, the V-phase correction angle 953 is described. The V-phase correction angle 953 is information for correcting the reference of the power distribution control when the reference position detection signal in calculating the correction coefficient 952 is other than the position detection signal Hv of the V-phase Hall sensor 3V in a case where the Hall sensor 3V is used as a reference of positioning with respect to the sensor magnet in the structure as shown in FIG. 2. Specifically, in the example shown in FIG. 4, a value representing, using an electric angle, the difference between the Hall edges HE3, HE6 in the position detection signal Hv and the Hall edges HE3c, HE6c in the position detection signal Hvc after correction becomes the V-phase correction angle 953. When the electric potential angle of the difference between the Hall edge HE3 and the Hall edge HE3c is different from the electric potential angle of the difference between the Hall edge HE6 and the Hall edge HE6c, for example, it is possible to make an average value of the electric potential angles to be the V-phase correction angle 953. The correction information generation section 94 can determine the V-phase correction angle 953 by using the time intervals T1 to T6 of the Hall edges HE1 to HE6 in the position detection signals Hu, Hv, Hw that are measured in a state where the brushless motor 1 is rotated at a constant speed similarly to when calculating the correction coefficient 952. The correction information generation section 94 stores the determined V-phase correction angle 953 in the storage section 95. The V-phase correction angle 953 is used in the power distribution control by the drive signal generation section 91.

The drive signal generation section 91 performs the power distribution control on the basis of the position detection signals Huc, Hvc, Hwc after correction that are generated by the position correction section 92. At that time, the drive signal generation section 91 increases a value of the advance angle by the angle of the V-phase correction angle 953. Thereby, the drive signal generation section 91 can perform a pseudo power distribution control with reference to the Hall edges HE3, HE6 of the position detection signal Hv before correction. For example, in the example shown in FIG. 4, when performing a power distribution control of the power distribution angle of 120° at the advance angle of 30°, the drive signal generation section 91 sets the advance angle to an angle of (the value of the V-phase correction angle 953+30°). The drive signal generation section 91 turns on the switching element VH at a position that is advanced by an angle of the value of the V-phase correction angle 953 from the Hall edge HE3c and turns off the switching element VH at a position that is advanced by an angle of the value of the V-phase correction angle 953 from the Hall edge HE5c.

Figure 5:
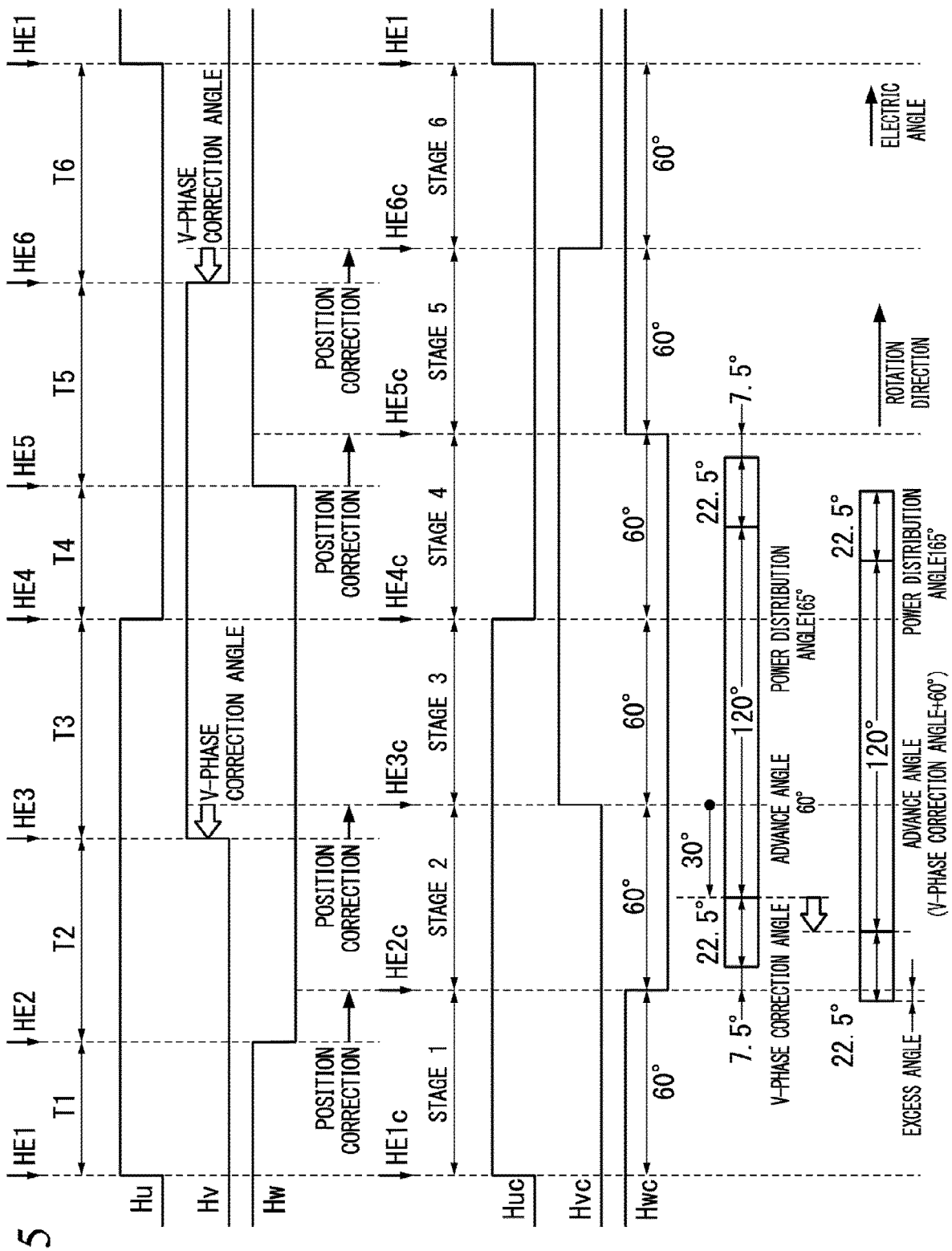
FIG. 5 is a view showing an operation example of the motor control apparatus shown in FIG. 1.

However, in the power distribution control by the drive signal generation section 91, when increasing the value of the advance angle by the value of the V-phase correction angle 953, the following problem occurs. That is, as shown in FIG. 5, in a case where the value of the power distribution angle or the advance angle is relatively large, a problem that the power distribution period may enter another Hall stage which the power distribution period does not enter when the V-phase correction angle 953 is not added occurs. FIG. 5 is a view using an electric angle for the horizontal axis and showing the position detection signals Hu, Hv, Hw, the position detection signals Huc, Hvc, Hwc that are obtained by correcting the position detection signals Hu, Hv, Hw by the position correction section 92, and an example of a power distribution control similarly to FIG. 3 and FIG. 4.

The example of the power distribution control shown in FIG. 5 is a case in which the advance angle is 60°, and the power distribution angle is 165°. If an advance angle that corresponds to the V-phase correction angle 953 is not performed, a period in which the switching element VH is turned on is within the stages 2 to 4 from the Hall edge HE2c to the Hall edge HE5c after correction. In this case, the switching element VH is turned on at a position that is delayed by 7.5° from the position of the Hall edge HE2c, and the switching element VH is turned off at a position that is advanced by 7.5° from the position of the Hall edge HE5c. On the other hand, when the value of the V-phase correction angle 953 exceeds 7.5°, the power distribution period enters the stage 1 by the amount of an excess angle beyond 7.5°. The added amount of the advance angle by the V-phase correction angle 953 is originally set for correcting a detection error.

Therefore, the error of the power distribution control in which the advance angle is set to the V-phase correction angle+60° shown in FIG. 5 should be theoretically smaller than the error of the power distribution control of the advance angle of 60° and the power distribution angle of 165° having no added amount of the advance angle by the V-phase correction angle 953. However, when the power distribution period that is set for another Hall stage enters a Hall stage that is not ordinarily entered, an ordinary power distribution pattern that is set to have the Hall stage as a unit cannot be used. A problem arises that it becomes impossible, by adding the V-phase correction angle, to perform the power distribution control of the advance angle of 60° and the power distribution angle of 165° that is able to be performed without any trouble before the V-phase correction angle is added.

Accordingly, in the present embodiment, an output pattern (a second output pattern 955) that corresponds to the excess angle (within the V-phase correction angle at the maximum) is prepared in addition to an ordinary output pattern (first output pattern 954), and the used output pattern is switched in accordance with the presence or absence of the excess angle. Thereby, it becomes possible to deal with the power distribution period that exceeds the stage by adding the V-phase correction angle which can be originally performed. The output pattern includes a plurality of power distribution patterns. The power distribution pattern is a combination of operation states of a plurality of switching elements WH, WL, VH, VL, UH, UL.

Figure 6:
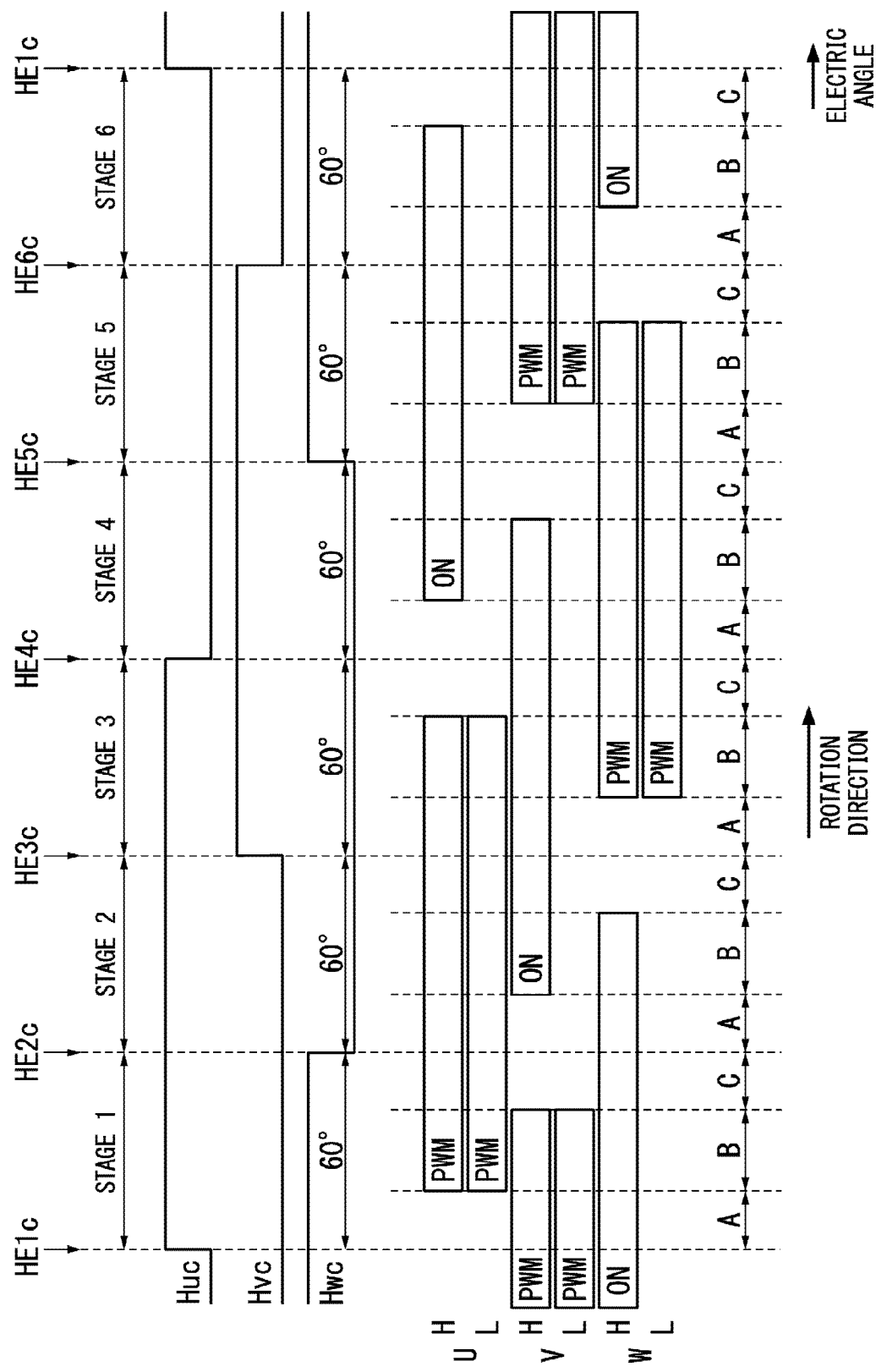
FIG. 6 is a view showing a change of a power distribution pattern on the basis of a first output pattern that is used by the motor control apparatus shown in FIG. 1.

FIG. 6 is a view showing an example of the first output pattern 954. FIG. 6 is a view using an electric angle as the horizontal axis and showing a correspondence relationship between the position detection signals Huc, Hvc, Hwc after correction and power distribution patterns of the switching elements UH, UL, VH, VL, WH, WL. The power distribution pattern is a combination of a state ("ON") in which each of the switching elements UH, UL, VH, VL, WH, WL is continuously turned on, a state (a period other than "ON" or "PWM") in which each of the switching elements UH, UL, VH, VL, WH, WL is continuously turned off "OFF", and a state (a state under a PWM control) ("PWM") in which each of the switching elements UH, UL, VH, VL, WH, WL is controlled to ON or OFF at a constant cycle. Each of the stages 1 to 6 is further classified into three zones A, B, C. A power distribution pattern is individually set for the zones A, B, C. The period (electric angle) of the zones A, B, C changes depending on the value (including the V-phase correction angle) of the advance angle and the value of the power distribution angle.

For example, in the stage 1 that is surrounded by the Hall edge HE1c and the Hall edge HE2c, the power distribution pattern of the zone A is a combination in which each of the switching elements UH, UL, VH, VL, WH, WL is each of "OFF", "OFF", "PWM", "PWM", "ON", "OFF". The power distribution pattern of the zone B is a combination in which each of the switching elements UH, UL, VH, VL, WH, WL is each of "PWM", "PWM", "PWM", "PWM", "ON", "OFF". The power distribution pattern of the zone C is a combination in which each of the switching elements UH, UL, VH, VL, WH, WL is each of "PWM", "PWM", "OFF", "OFF", "ON", "OFF".

FIG. 7 summarizes the example of the first output pattern 954 shown in FIG. 6 as a table. The storage section 95 stores the first output pattern 954, for example, in a form as shown in FIG. 7. In FIG. 7, "1" represents "ON", "0" represents "OFF", and "P" represents "PWM".

Figure 8:
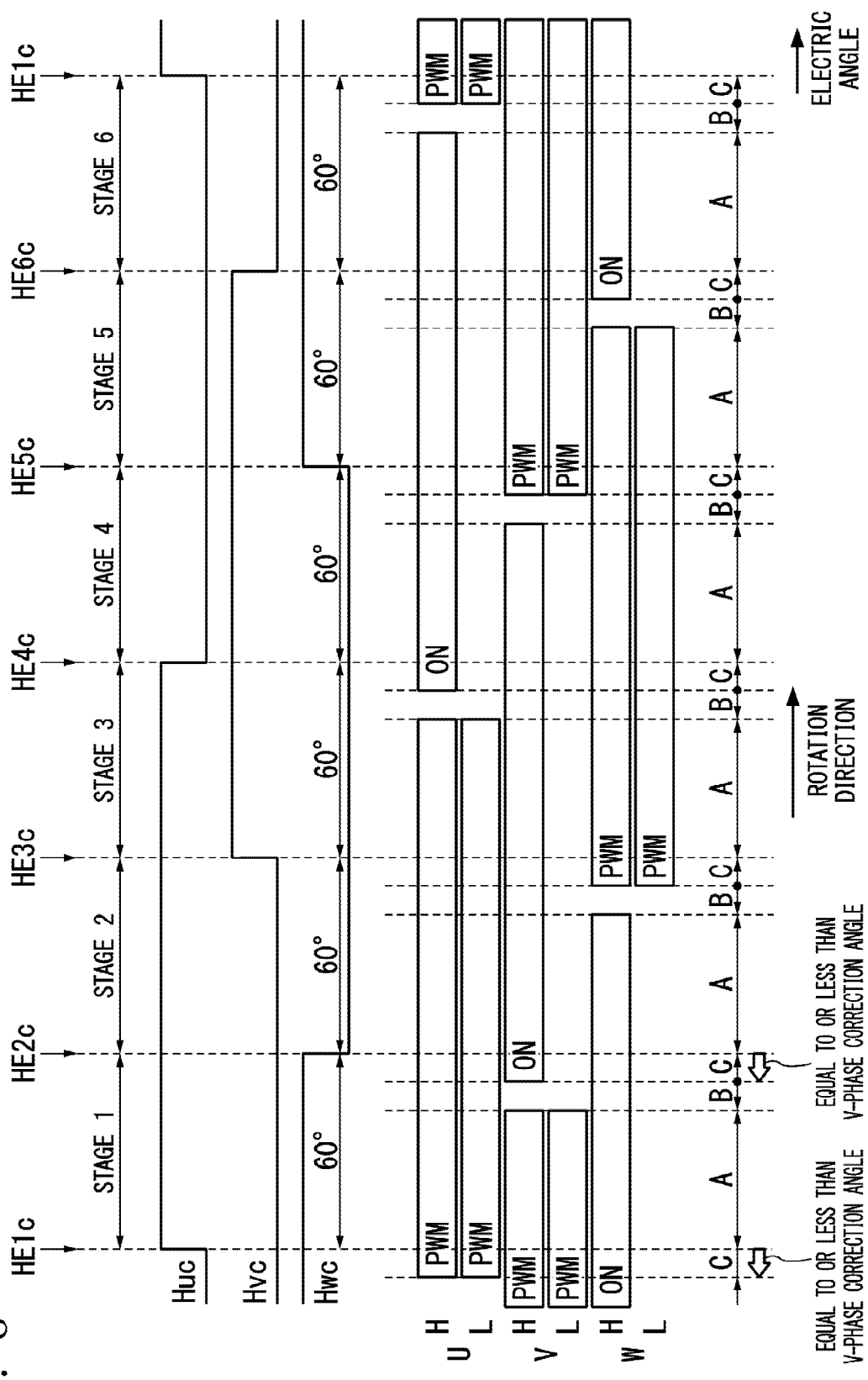
FIG. 8 is a view showing a change of a power distribution pattern on the basis of a second output pattern that is used by the motor control apparatus shown in FIG. 1.

FIG. 8 is a view showing an example of the second output pattern 955. FIG. 8 is a view using an electric angle as the horizontal axis and showing a correspondence relationship between the position detection signals Huc, Hvc, Hwc after correction and power distribution patterns of the switching elements UH, UL, VH, VL, WH, WL similarly to FIG. 6. Each of the stages 1 to 6 is further classified into three zones A, B, C similarly to the first output pattern 954. The period (electric angle) of the zones A, B, C changes depending on the value (including the V-phase correction angle) of the advance angle and the value of the power distribution angle. The zone C corresponds to the excess angle described with reference to FIG. 5. Accordingly, the electric angle of the zone C is set to (the V-phase correction angle+the advance angle (an angle obtained by subtracting an electric angle of 30°)+the power distribution angle (½ of an angle increased from 120°)). The electric angle of the zone C is limited to the value of the V-phase correction angle at the maximum.

For example, in the stage 1 that is surrounded by the Hall edge HE1c and the Hall edge HE2c, the power distribution pattern of the zone A is a combination in which each of the switching elements UH, UL, VH, VL, WH, WL is each of "PWM", "PWM", "PWM", "PWM", "ON", "OFF". The power distribution pattern of the zone B is a combination in which each of the switching elements UH, UL, VH, VL, WH, WL is each of "PWM", "PWM", "OFF", "OFF", "ON", "OFF". The power distribution pattern of the zone C is a combination in which each of the switching elements UH, UL, VH, VL, WH, WL is each of "PWM", "PWM", "ON", "OFF", "ON", "OFF".

Figures 9, 10:
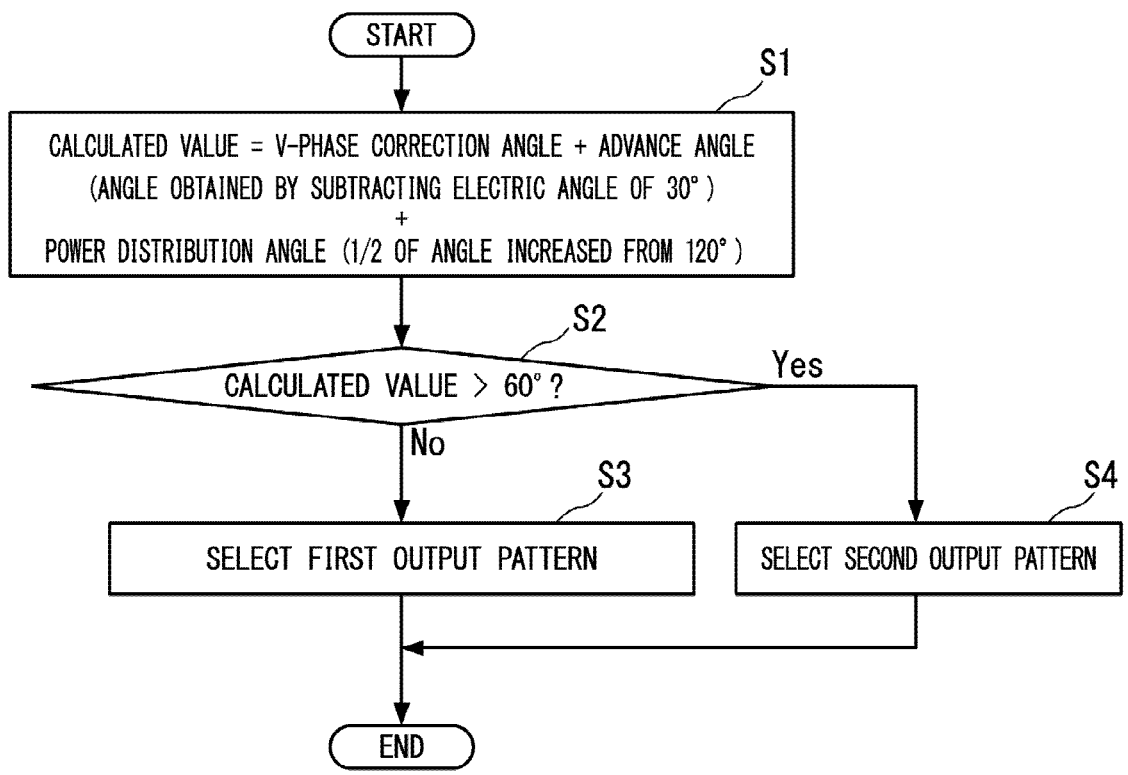
FIG. 9 is a view showing the second output pattern that is used by the motor control apparatus shown in FIG. 1.
FIG. 10 is a flowchart showing an operation example of an output pattern selection part shown in FIG. 1.

FIG. 9 summarizes the example of the second output pattern 955 shown in FIG. 8 as a table. The storage section 95 stores the second output pattern 955, for example, in a form as shown in FIG. 9. In FIG. 9, "1" represents "ON", "0" represents "OFF", and "P" represents "PWM".

The drive signal generation section 91 shown in FIG. 1 performs a power distribution control by using an output pattern (the first output pattern 954 or the second output pattern 955) that is selected by the output pattern selection section 93. The output pattern selection section 93 refers to the V-phase correction angle 953 that is stored by the storage section 95 and receives the setting values of the advance angle and the power distribution angle in the power distribution control from the drive signal generation section 91. Then, the output pattern selection section 93 selects an output pattern, for example, by a process shown in FIG. 10 and transmits information indicating the selected output pattern to the drive signal generation section 91.

FIG. 10 is a flowchart showing an operation example of the output pattern selection section 93. The output pattern selection section 93 performs the process shown in FIG. 10, for example, when the setting values of the advance angle and the power distribution angle are changed in the drive signal generation section 91. The output pattern selection section 93 calculates a value of the V-phase correction angle+the advance angle (an angle obtained by subtracting an electric angle of 30°)+the power distribution angle (½ of an angle increased from 120°) (Step S1). Next, the output pattern selection section 93 determines whether or not the value that is calculated in Step S1 is larger than 60° (Step S2). When the calculated value is not larger than 60° (in a case of No in Step S2), the output pattern selection section 93 selects the first output pattern 954 (Step S3). When the calculated value is larger than 60° (in a case of Yes in Step S2), the output pattern selection section 93 selects the second output pattern 955 (Step S4). After the processes of Step S1 to S4, the output pattern selection section 93 transmits information indicating the selected output pattern to the drive signal generation section 91 and ends the process.

As described above, the motor control apparatus 4 of the present embodiment corrects the dispersion of the position detection signals Hu, Hv, Hw that are output by the Hall sensors 3U, 3V, 3W and corrects a position that becomes a reference in a power distribution control by adding, to the setting value of the advance angle of the power distribution control, the advance angle of the V-phase correction angle that corresponds to a difference between positions of the Hall edges H3c, H6c of the position detection signal Hvc after correction and the Hall edges H3, H6 of the position detection signal Hv of the Hall sensor 3V.

Accordingly, it is possible to correct the detection error of the rotation position of the rotor at low cost and with high accuracy. Further, the motor control apparatus 4 of the present embodiment selectively uses two types of output patterns in the power distribution control and thereby adds the V-phase correction angle to the setting value of the advance angle, and thereby, the control range (the range of the advance angle and the range of the power distribution angle) of the power distribution control is not limited.

The present embodiment is the motor control apparatus 4 that performs a power distribution control on the three-phase coils U, V, W of the brushless motor 1 and that performs a rotation control of the rotor. The motor control apparatus 4 includes: a plurality of switching elements UH, UL, VH, VL, WH, WL that are arranged to be capable of switching a current which is allowed to flow through the coils U, V, W; a plurality of Hall sensors 3U, 3V, 3W that detect a rotation position of the rotor; and the control part 9 that outputs PWM signals (drive signal) CWH, CWL, CVH, CVL, CUH, CUL for controlling the power distribution pattern of each of the switching elements UH, UL, VH, VL, WH, WL on the basis of the position detection signals Huc, Hvc, Hwc which are obtained by correcting the position detection signals Hu, Hv, Hw as the outputs of the plurality of Hall sensors 3U, 3V, 3W by using a predetermined correction coefficient. The control part 9 adds the V-phase correction angle (correction angle) that corresponds to the difference between the position detection signals Hv, Hvc before and after correction of the Hall sensor 3V (predetermined sensor) among the plurality of Hall sensors 3U, 3V, 3W to a setting value of an advance angle of the power distribution control and selects an output pattern that includes a plurality of power distribution patterns and that is used when selecting the power distribution pattern, from the first output pattern and the second output pattern that are different from each other in accordance with the advance angle to which the V-phase correction angle is added and a power distribution angle of the power distribution control.

Further, in the present embodiment, the power distribution pattern is controlled in synchronization with a timing (Hall edge) of rising or falling of the position detection signals Huc, Hvc, Hwc, the first output pattern is an output pattern that does not include a power distribution pattern which makes the switching element be continuously in the same power distribution state throughout three or more timings, and the second output pattern is an output pattern that includes the power distribution pattern which makes the switching element be continuously in the same power distribution state throughout three or more timings.

The motor control apparatus 4 in the embodiment described above may be realized by a computer. In that case, a program for realizing this function may be recorded in a computer-readable recording medium, and the program recorded in the recording medium may be read into and executed on a computer system to thereby realize the function. The "computer system" used herein includes an OS or hardware such as peripherals. The "computer-readable recording medium" refers to portable media such as a flexible disk, a magneto-optical disc, a ROM, and a CD-ROM and a storage device such as a hard disk embedded in the computer system. Further, the "computer-readable recording medium" may include a recording medium that holds a program dynamically for a short period of time like a network such as the Internet or a communication line when a program is transmitted through a communication line such as a telephone line and may include a recording medium that stores a program for a predetermined period of time like a volatile memory in a computer system which serves as a server or a client in that case. Further, the above program may be a program for realizing some of the functions described above, may be a program capable of realizing the above functions by combination with a program already recorded in the computer system, or may be a program that is realized by using a programmable logic device such as the FPGA (Field-Programmable Gate Array).

Although the embodiment of the invention has been described in detail with reference to the drawings, a specific configuration is not limited to the embodiment, and designs and the like without departing from the scope of the invention are also included.

DESCRIPTION OF THE REFERENCE SYMBOLS 1 brushless motor
3U, 3V, 3W Hall sensor (sensor)
4 motor control apparatus
6 inverter circuit 7 control circuit
8 gate control voltage output unit
9 control part
91 drive signal generation section
92 position correction section
93 output pattern selection section
94 correction information generation section
95 storage section
951 drive information
952 correction coefficient
953 V-phase correction angle
954 first output pattern
955 second output pattern
U, V, W coil
UH, UL, VH, VL, WH, WL switching element

The invention claimed is:

1. A motor control apparatus that is configured to perform a power distribution control on three-phase coils of a brushless motor and that is configured to perform a rotation control of a rotor, the motor control apparatus comprising:
   a plurality of switching elements that are arranged to be capable of switching a current which is allowed to flow through the coils;
   a plurality of sensors that are configured to detect a rotation position of the rotor; and
   a control part that is configured to output a drive signal for controlling a power distribution pattern of each switching element according to a position detection signal which is obtained by correcting a position detection signal as an output of the plurality of sensors by using a predetermined correction coefficient,
   wherein the control part is configured to
   add a correction angle that corresponds to a difference between the position detection signals before and after correction of a predetermined sensor among the plurality of sensors to a setting value of an advance angle of the power distribution control and
   select an output pattern that includes a plurality of the power distribution patterns and that is used when selecting the power distribution pattern, from a plurality of the different output patterns in accordance with the advance angle to which the correction angle is added and a power distribution angle of the power distribution control.

2. The motor control apparatus according to claim 1,
   wherein the power distribution pattern is controlled in synchronization with a timing of rising or falling of the position detection signal, and
   the plurality of output patterns include
      a first output pattern that does not include a power distribution pattern which makes the switching element be continuously in the same power distribution state throughout three or more timings and
      a second output pattern that includes the power distribution pattern which makes the switching element be continuously in the same power distribution state throughout three or more timings.

3. A motor control apparatus control method which is a control method of a motor control apparatus that is configured to perform a power distribution control on three-phase coils of a brushless motor and that is configured to perform a rotation control of a rotor, the motor control apparatus comprising:
   a plurality of switching elements that are arranged to be capable of switching a current which is allowed to flow through the coils;
   a plurality of sensors that are configured to detect a rotation position of the rotor; and
   a control part that is configured to output a drive signal for controlling a power distribution pattern of each switching element according to a position detection signal which is obtained by correcting a position detection signal as an output of the plurality of sensors by using a predetermined correction coefficient,
   wherein the control method comprises: by way of the control part,
   adding a correction angle that corresponds to a difference between the position detection signals before and after correction of a predetermined sensor among the plurality of sensors to a setting value of an advance angle of the power distribution control; and
   selecting an output pattern that includes a plurality of the power distribution patterns and that is used when selecting the power distribution pattern, from a plurality of the different output patterns in accordance with the advance angle to which the correction angle is added and a power distribution angle of the power distribution control.

* * * * *